No. 796,653. PATENTED AUG. 8, 1905.
J. D. HORTON & A. W. KAESSNER.
BOOK ASSEMBLING MACHINE.
APPLICATION FILED DEC. 29, 1898. RENEWED DEC. 24, 1902.

5 SHEETS—SHEET 1.

WITNESSES:
Albert Ottinger
W. H. Pumphrey.

INVENTORS
Jesse D. Horton and Albert W. Kaessner
BY
H. M. Mackay
ATTORNEY

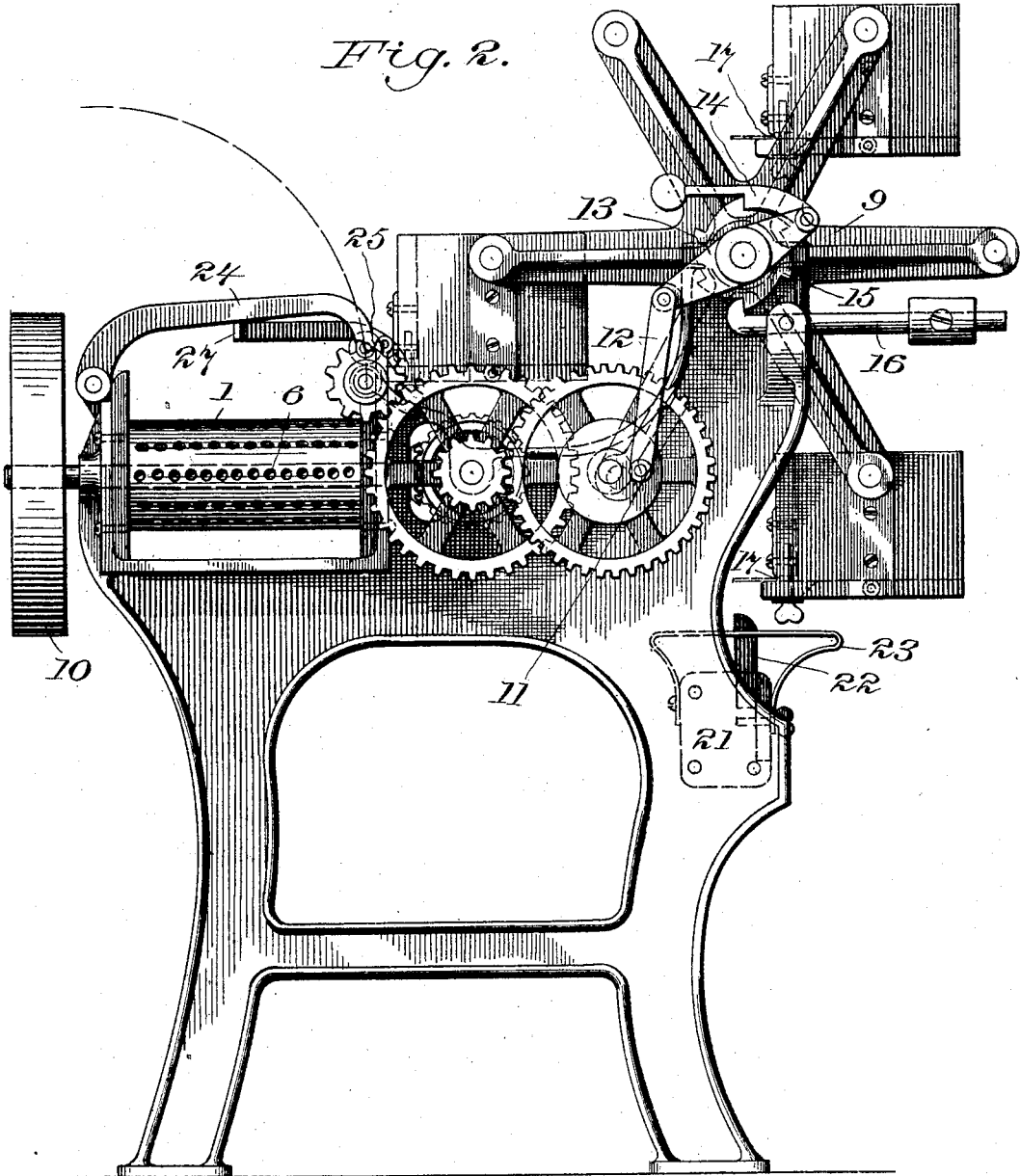

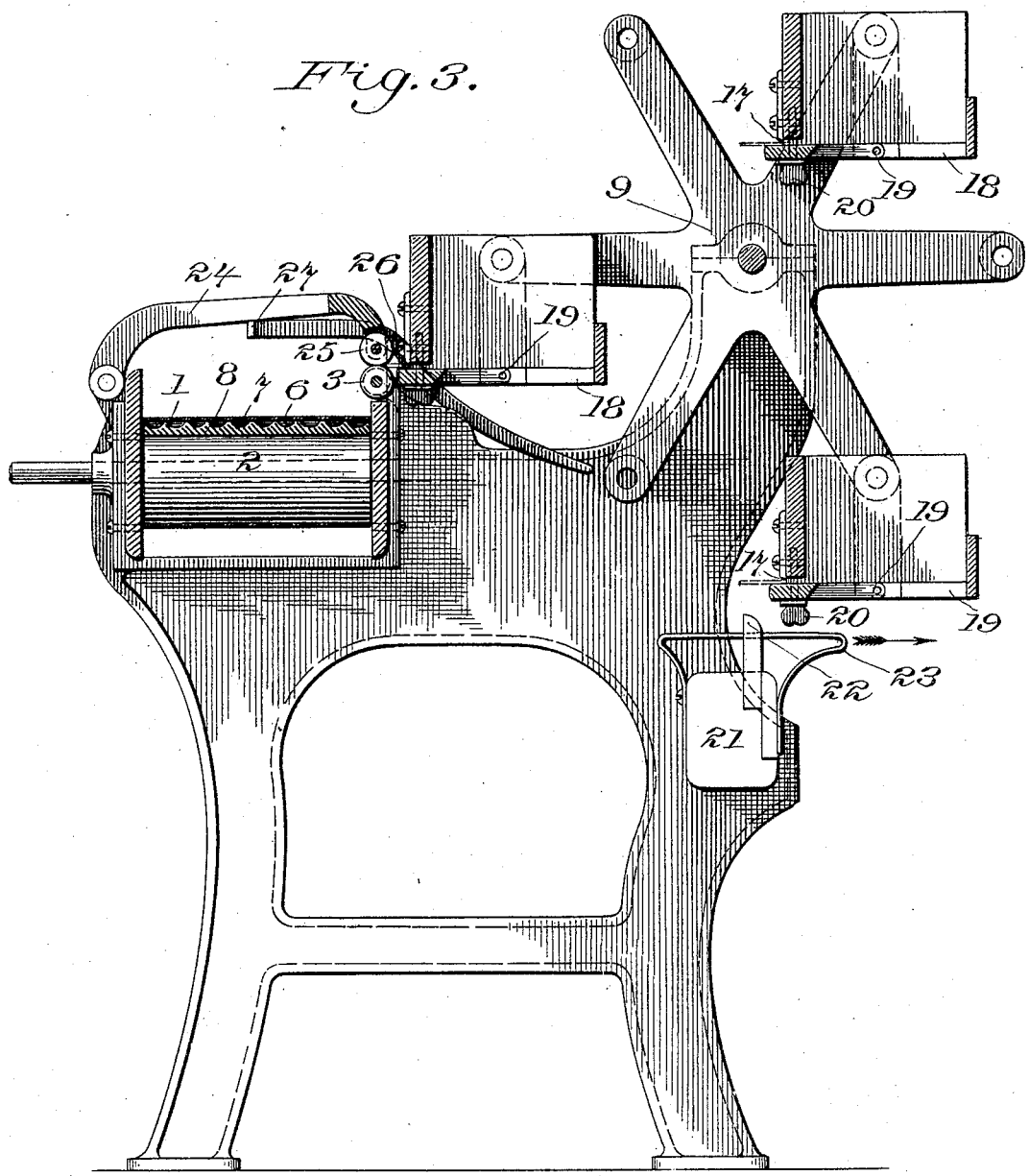

No. 796,653. PATENTED AUG. 8, 1905.
J. D. HORTON & A. W. KAESSNER.
BOOK ASSEMBLING MACHINE.
APPLICATION FILED DEC. 29, 1898. RENEWED DEC. 24, 1902.
5 SHEETS—SHEET 4.
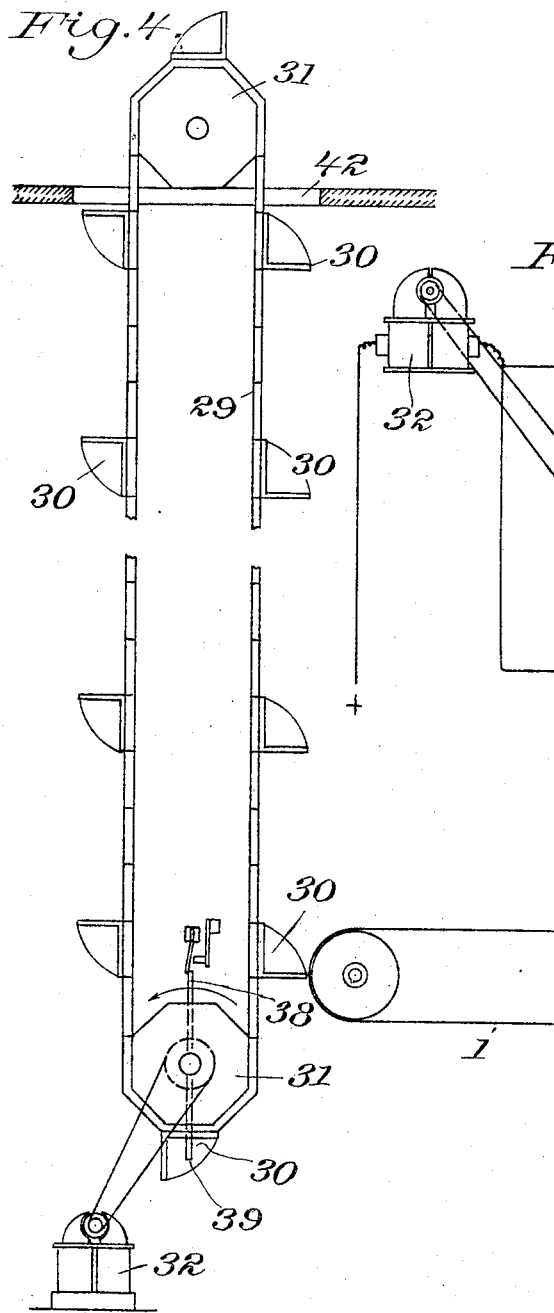
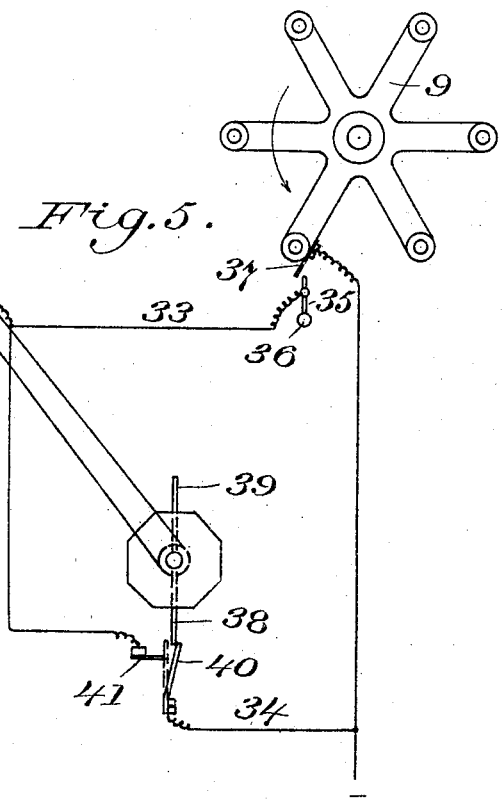
WITNESSES:
Albert Attinger
W. H. Humphrey
INVENTORS
Jesse D. Horton and Albert W. Kaessner
BY H. M. MacKaye
ATTORNEY No. 796,653.

PATENTED AUG. 8, 1905.

J. D. HORTON & A. W. KAESSNER.
BOOK ASSEMBLING MACHINE.
APPLICATION FILED DEC. 29, 1898. RENEWED DEC. 24, 1902.

5 SHEETS—SHEET 5.

WITNESSES:
Albert Ottinger
W. H. Pumphrey

INVENTORS
Jesse D. Horton and Albert W. Kaessner
BY H. Mackaye
ATTORNEY

UNITED STATES PATENT OFFICE.

JESSE D. HORTON, OF NEW YORK, N. Y., AND ALBERT W. KAESSNER, OF JERSEY CITY, NEW JERSEY.

BOOK-ASSEMBLING MACHINE.

No. 796,653.           Specification of Letters Patent.           Patented Aug. 8, 1905.

Application filed December 29, 1898. Renewed December 24, 1902. Serial No. 136,499.

*To all whom it may concern:*

Be it known that we, JESSE D. HORTON, residing in the city, county, and State of New York, and ALBERT W. KAESSNER, residing at Jersey City, in the county of Hudson and State of New Jersey, citizens of the United States, have invented a new and useful Improvement in Book-Assembling Machines, of which the following is a specification.

Our invention has for its main object the rapid automatic assembling of book-signatures in their proper order for binding by simple means occupying a minimum space and operating with the least possible waste of time.

One object of our invention is the provision of means, combined with devices for delivering the signatures in their proper order in unbound books, whereby the books as completed may be conveyed automatically to any desired point without the intervention of an operative.

Another object of our invention is the provision of means for accomplishing very rapid delivery of the signatures without danger from "flirting" due to air-pressure.

Our invention comprises a number of improvements in the details of construction, which are hereinafter described and specifically claimed.

A conspicuous advantage incident to use of our invention lies in the fact that it enables an operator to see the signature-boxes before they come into feeding position, and thus insures proper disposition of the signatures about to be acted on relative to their boxes and avoids opportunity for confusion in delivery due to sticking in the box or other similar accident.

Our invention is illustrated in the accompanying drawings, wherein—

Figure 1:
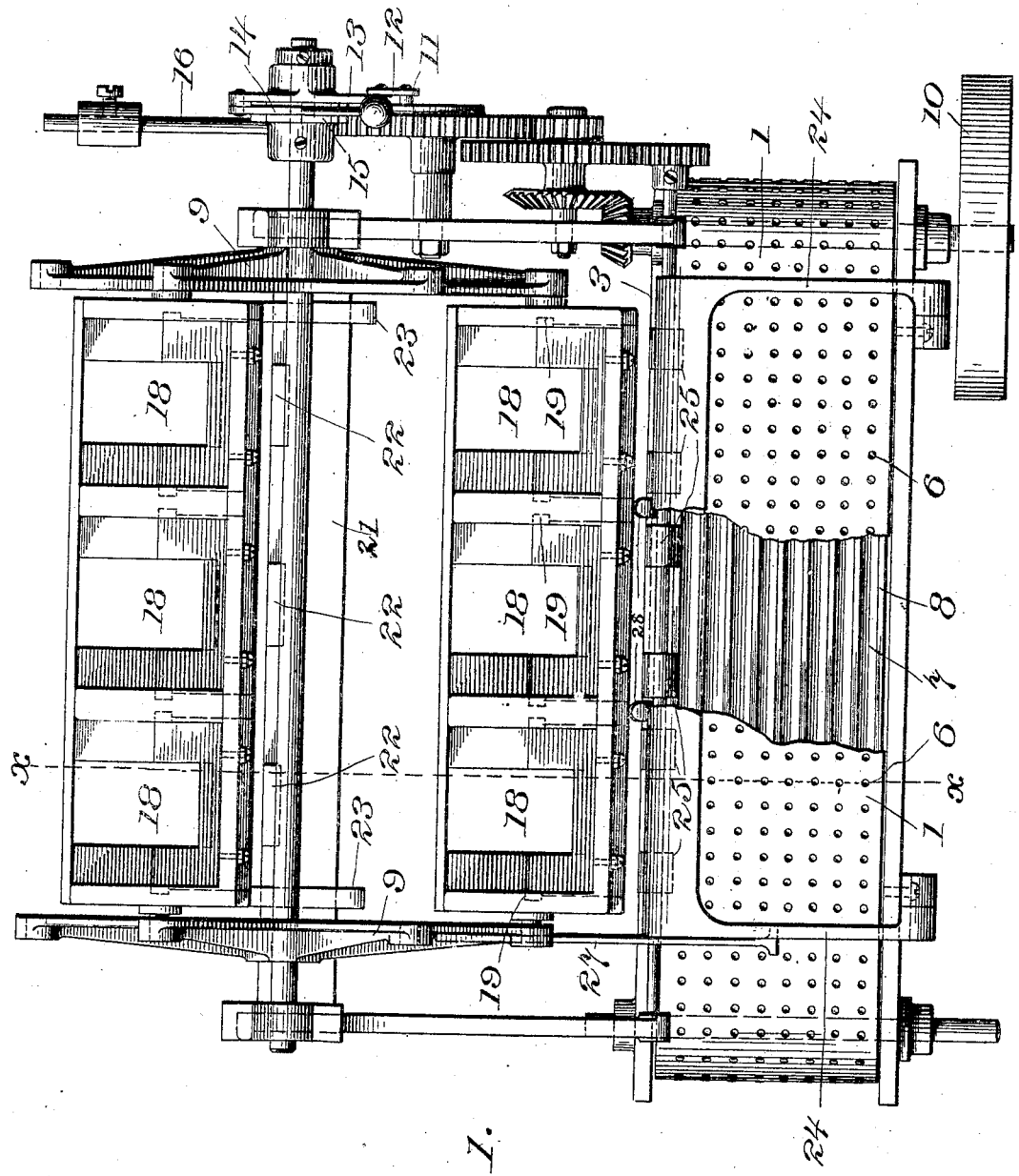
Figure 6:
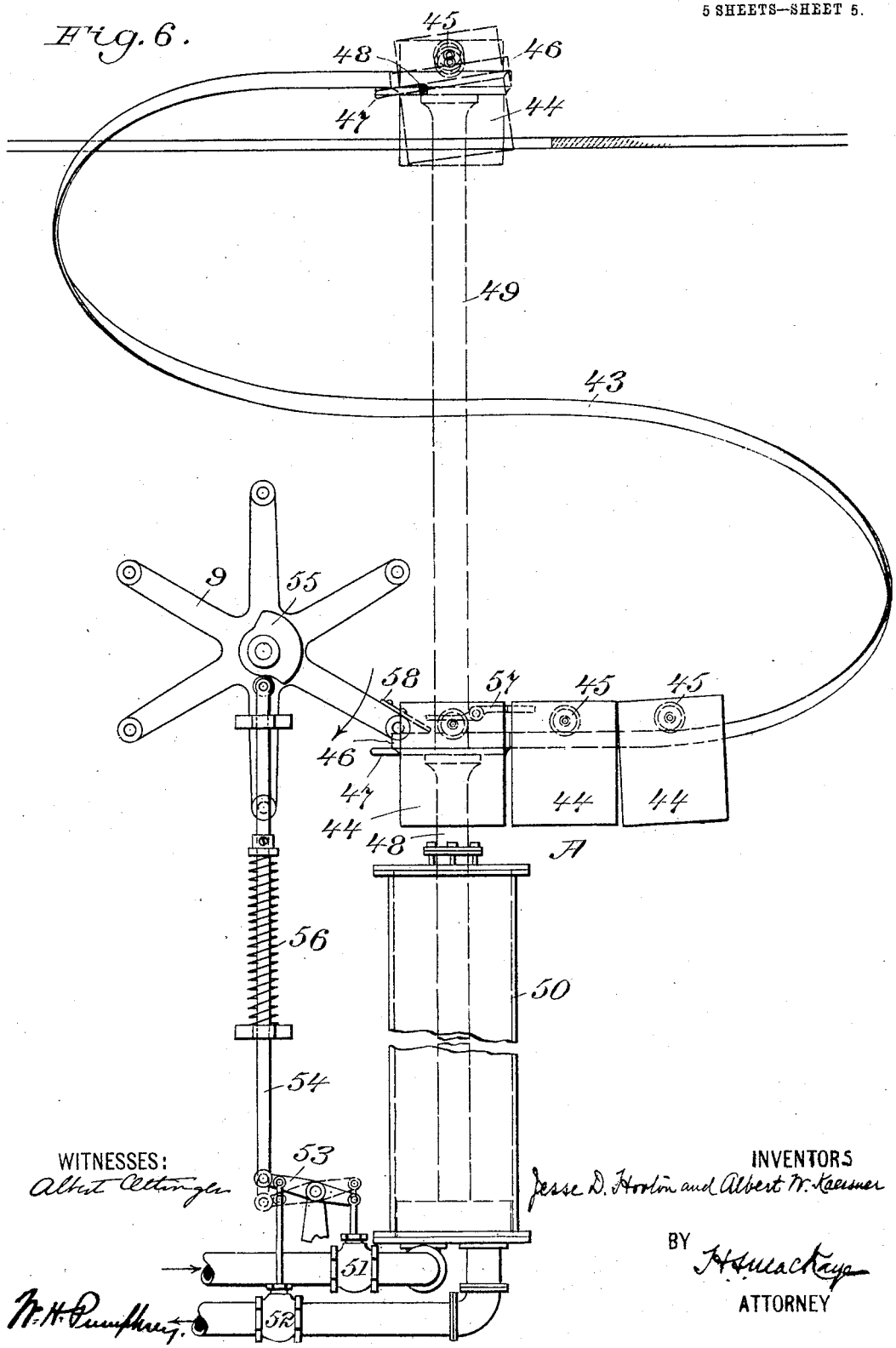

Figure 1 is a plan view of a six-row machine built in accordance with our invention, but having alternate rows of boxes removed, as well as a portion of the delivery belt, for better illustration of details. Fig. 2 is a side view from the right-hand end of the machine shown in Fig. 1. Fig. 3 is a vertical section on the plane $x\,x$ in Fig. 1. Fig. 4 is a diagrammatic side view of one book-conveying device suitable for use with our machine. Fig. 5 shows the electric circuits employed in the operation of the conveyer shown in Fig. 4; and Fig. 6 is an elevation, partly in diagram, of a modification of conveyer.

Our machine belongs to that class wherein the signatures are fed by means of a roller from a row of boxes onto a moving delivery-belt parallel to and in front of said row. In the accompanying drawings the moving belt is shown at 1 and the rollers which carry it at 2. The main or lower feed-roller is shown parallel to the belt at 3. We prefer to make this roller of knurled iron, although of course we do not limit ourselves to the use of this material. Inasmuch as our machine permits of very rapid running, use of the belts as hitherto made for this purpose tends to increase the considerable lifting effect on the moving signatures due to air-pressure beneath them. This of course acts to disturb the delivery of the signatures and cause confusion. In order to obviate this difficulty, we prefer to construct our belt delivery as illustrated in Figs. 1, 2, and 3, wherein the moving belt is shown perforated, the perforations 6 being arranged to move over parallel grooves 7 in the upper surface of the belt-supporting shelf 8. By use of this construction a considerable increase of belt speed can be attained without danger from the floating effect of the air under the signatures.

Our principal improvement lies in the provision of movable rows of signature-boxes, whereby a machine for assembling a given number of signatures may be made to occupy a much smaller space and to act more continuously than where such signatures are delivered from a single immovable row of boxes, as hitherto practiced. In the drawings we have illustrated a machine carrying six rows and three boxes in each row. These numbers were chosen for convenience in illustration, and in practice more boxes would be used in each row; but it is to be understood that any number of rows and one box or any number of boxes per row may be used without departing from the spirit of our present invention. As clearly shown in Figs. 1, 2, and 3, each row is pivoted at each end on the extremity of one arm of a supporting-spider 9. The suspension is such that the center of gravity is always below the pivot, and the rows of boxes thus remain always horizontal while the supporting-spiders rotate. It is clear that as the spiders rotate the suspended boxes are successively brought opposite to the feed-roller 3 from above. The rotation is intermittent and may be accomplished in any one of a variety of ways well understood to mechanics. In our preferred embodiment we apply the power through the driving-pulley 10 on the same shaft with the roller which drives the belt. By means of appropriate gearing—for instance, as shown in Fig. 1—we impart a high relative velocity to the feed-roller 3 and a slow rotation to the pivot 11 of the connecting-arm 12. (See Fig. 2.) For each revolution of pivot 11 the rocking bar 13 is made to rock back and forth once. Thus the weighted pawl 14, pivoted on this rocking bar, acts to turn the ratchet 15 through one tooth. The weighted retaining catch or pawl 16 or other appropriate means is employed to prevent accidental backward movement of the ratchet-wheel. The ratchet-wheel 15 is fast on the shaft of the spider 9, Fig. 2, and has the same number of teeth as the spider has arms—as shown six. Thus for every revolution of the pivot 11 one row of boxes is removed and another substituted in front of the feeding-roller 3. As shown in dotted lines in Fig. 3, the bottom signature in each box projects through the slit or space between the front of its box and the edge of the bottom. As shown in Figs. 1 and 3, this bottom is cut out, as at 18, leaving supporting edges on three sides. These edges are pivoted—as, for instance, at 19—and at the front a set-screw 20 for each box makes it possible to adjust the width of the opening 17 to allow one signature only to pass at a time. For practical purposes it is best to have the bottom of each box separately adjustable, as, even in the same book, the signatures are liable to vary in width—as, for instance, where maps or plates occur. The bottom signature is made to protrude in the manner illustrated, preferably, by the following means: On a cross-bar 21 beneath the revolving rows of boxes we place a series of abutments 22, preferably of rubber. These are so located that they come in contact with the unsupported surface of the lowermost signature in each box just before it reaches the limit of its downward travel. At this time the movement of the boxes is nearly horizontal and in the direction of the arrow in Fig. 3. Consequently the friction against the rubber abutment 22 causes the signature to be thrust forward into the position shown in dotted lines. In order to prevent tipping of the suspended boxes, we prefer to provide steadying-rests, which may conveniently be made of flat springs, such as are shown at 23. These are tangential to the circle described by the bottoms of the boxes and keep the latter level during the action of the abutments 22. As shown in Fig. 1, we prefer to use two of these springs, one being at each end of the machine. The mode of action of the feed-roller 3 will now be apparent. Each operation of the pawl 14 brings a new row of boxes opposite the roller, thus bringing the under surface of the protruding signature down onto the roller 3, which is revolving rapidly. A pivoted frame 24 overhangs the belt 1 and is provided at its extremity with means for bearing down upon the feed-roller 3. A variety of such means might be employed; but we prefer to use the rollers 25, which may be made of knurled iron or other material.

Pivoted to the machine-frame, as at 26, preferably opposite the driving-gears, (see Figs. 1 and 3,) is a lever 27, whose rear end projects into the path of the rotating spider-arms. Its opposite end projects under the overhanging frame 24, and it is so shaped that each spider-arm as it strikes the lever acts to lift the frame 24. This operation is so timed that the raising of the frame 24 permits the approaching signature to come down upon the feed-roller 3. Then the spider-arm releases the lever 27, and the weight of the frame 24 clips the signature between rollers 25 and 3, causing the rapid revolution of roller 3 to throw the signature out onto the belt 1. The movement of the spiders should be so timed by appropriate gearing that the rows come into feeding position at time intervals equal to the time required by the belt to carry the last signature past the first box. Thus the belt will be kept always full, and a maximum speed of delivery will be secured. Where automatic book-conveyers are used, this rule may require modification, as hereinafter described.

In Fig. 1 we have shown springs 28, projecting between the feed-roller 3 and the fronts of the box-partitions. These we preferably employ in order to counteract the tendency of the boxes to tip up and ride on the roller 3 when the signatures are pulled out.

The mechanism thus far described is completely operative to deliver signatures at the end of the belt 1 in the proper order, which is obviously determined by proper distribution in the boxes. Thus after one revolution of the box-carrying mechanism signatures corresponding to the whole capacity of the machine have been delivered in proper order. This capacity may correspond to an entire volume or to any part of one or to more than one. The books as thus formed at the end of the belt should of course be taken away separately, and, while this can be done by hand, we prefer to employ an automatic conveyer, whereby the books may be transported as fast as formed to the vicinity of such other machinery as may be required for carrying on the next step in the binding process. This combination of conveyer and assembler is believed to be a novel one and is claimed, broadly, by us. A number of modifications of the combination might be devised, and we have thought it sufficient to illustrate two such modifications.

In Fig. 4 we have shown the delivery belt and roller at 1 and opposite the end thereof an endless conveyer-belt 29, which may be made up of rigid sections or be flexible, as desired. Upon this belt we fasten a number of boxes or shoes 30 of suitable shape and size for receiving the signatures as they come off of the belt. In order to accommodate these rigid boxes at the bends in the belt, we prefer to use pulleys of appropriate conformation—as, for instance, octagonal pulleys 31. One of these is driven by a suitable motor stopped and started at proper intervals by mechanism connected with the revolving boxes. The motor is illustrated in Figs. 4 and 5 at 32 as an electric motor. One means for stopping and starting the motor 32 at the proper moment is as illustrated and includes a current-supply circuit of two branches 33 and 34. (See Fig. 5.) Circuit 33 includes an appropriate contact-maker operated by the assembling-machine. This may appropriately consist of a swinging contact 35, held in one position by a weight 36 and standing in the path of another terminal on one of the spider-arms. These terminals are so placed that during the movement which brings a new box in place after completion of a book contact 37 is caused to strike 35 and, swinging it aside, to break the contact so made. The making of this contact starts the motor 32 and with it the pulleys 31 and belt 29. Turning with one of the pulleys 31 are two diametrically-opposed arms 38 and 39, so placed that when a box 30 is in proper position in front of the belt the contacts 40 and 41 in circuit branch 34 are held apart, but arm 38 or 39 is just on the point of releasing the spring 40 and permitting contact. When the motor starts, the spring-contact 40 is immediately released by movement of arm 38, and thus the circuit first established through branch 33 is maintained through 34. The motor continues to revolve until pulleys 31 turn through a half-circle, thus bringing an empty box 30 in front of the belt. At this moment the arm 39 opens circuit branch 34 at 40 and the motor stops. Thus the books are carried step by step to a floor above (shown at 42) and may there be subjected to further treatment. Of course the number of makes and breaks of current for each revolution of the assembling-machine may be varied at will and the boxes be moved oftener than once per revolution, if desired. The location of arms 38 and 39 depends, of course, on the distance apart of the boxes relatively to the size of the pulleys 31. These are all details which may be indefinitely varied without departing from the scope of our invention.

In Fig. 6 is shown a modified form of conveyer depending upon different principles both as to returning-conveyer and starting mechanism. The double curve 43 indicates a spiral return-track in side view. On this track run a number of boxes 44, suspended upon appropriate rollers 45, which may run upon the track under the influence of gravity. The position of the assembling-machine relative to the conveyer is indicated by the spider-arms in Fig. 6, it being understood that the conveyer is at the feeding end of the belt 1. The letter A in Fig. 6 indicates that box 44 which is opposite to the belt 1, and just to the left thereof a box 44 is shown which has just been allowed to run by gravity onto the movable track-section 46 in a manner described hereinafter. The track-section 46 is provided with a catch 47 and is adapted to tip on a pivot 48. (See upper part of Fig. 6.) This track-section is carried upon the piston 49 of an engine-cylinder, preferably hydraulic, having inlet and outlet valves 51 52. A common rocking lever 53 operates these valves in opposite directions when moved by the rod 54, which is held against a cam 55 by means of a spring 56 or otherwise. In the position illustrated, assuming that the spider-arms 9 are rotating as indicated by the arrow, the cam is on the point of opening the inlet-valve, which opening should occur just after tripping of the box-releasing catch, as described hereinafter. The water, air, or steam being thus admitted to cylinder 50, the newly-filled box 44 on section 46 of track is raised to the top of the spiral track. Here the catch 47 strikes under the track, and on further movement of the piston-rod 49 the track-section 46 tips up, as shown in dotted lines, and sends box 44 on its way down the spiral track. The shape of path and the extent of the track are made to suit the convenience of the user, and the filled box may be stopped at any point on its return, the book removed, and the box will continue on its way and take its place in line with the empty boxes awaiting their turns to be filled. When the track-section 46 starts up, the box A, which is being filled, is prevented from rolling off the track by any appropriate pivoted stop 57 in line with the finger 58 on the proper spider-arm. Before the spider-arms have made a half-revolution the box has been carried to the top of the track and tipped off. Then the cam opens the exhaust-port and closes the inlet-port to cylinder 50, thus letting the track return to the lower position. At the proper time finger 58 trips the stop 57 and lets the filled box onto the movable section, as before, and the operation is repeated.

It is clear that where the receiving-boxes of a conveyer are used the belt 1 on the assembling-machine cannot be kept always filled without danger of confusion at the moment of substituting one box for another. It will be best to provide for a proper interval of idleness to permit one box to be replaced by the next. This can be done by proper designing of the driving-gear ratios or in a variety of ways well known to machinists.

Our invention is susceptible of many modifications in details without evading its scope, and we do not wish to be understood as limiting ourselves to the specific detailed embodiment thereof which we have shown and described.

What we claim is—

1. In a book-assembling machine, a plurality of signature-boxes provided with delivery-openings for signatures, means for bringing said boxes successively to the delivery-point, means at one point of the path of travel of said boxes for producing partial protrusion of one signature at a time in said boxes successively and means located at another point in the said path of travel adapted to grasp the protruding portions of said signatures for delivering the same.

2. In a book-assembling machine, a plurality of signature-boxes, a feed-roller, a movable frame over said roller, mechanism for bringing said boxes successively opposite said roller and means operated by said latter mechanism for simultaneously causing operative contact between said roller and frame.

3. In a book-assembling machine, rotary arms, signature-boxes suspended on the same, a feed-roller, a movable frame over said roller, and a pivoted lever for raising said frame, the rear end of said lever being in the path of movement of said rotary arms.

4. In a book-assembling machine, a movable signature-box having a slit in front and cut away underneath so as to expose a portion of the bottom signature, and a frictional rubber adapted to press against said exposed portion of the bottom signature to push it through said slit.

5. In a book-assembling machine, a movable signature-box having a slit in front and cut away underneath so as to expose a portion of the bottom signature, and a stationary frictional rubber adapted to press against said exposed portion of the bottom signature as it passes said rubber, so as to push the signature through said slit.

6. In a book-assembling machine, a movable signature-box, a pivotal suspension therefor, means adapted to cause protrusion of signatures from said box, and means adapted to engage said box during the operation of the protruding means for keeping the box steady on its pivots.

7. In a book-assembling machine, two sets of similar rotary arms, signature-boxes suspended between said arms, a feed-roller, means for driving the feed-roller, and gearing between said roller and said arms whereby intermittent movement of the arms accompanies continuous movement of the roller.

8. In a book-assembling machine, feeding devices, rows of signature-boxes having a portion of the bottom of each box cut away, means for intermittently and successively bringing the rows of boxes opposite the feeding devices, stationary frictional rubbers in the path of movement of the cut-away portions of the box-bottoms, and a delivery-belt moving in front of said feeding devices.

9. In a book-assembling machine, horizontal rows of signature-boxes, a revolving shaft for causing forward movement of the same, a delivery-belt, means for delivering signatures from said boxes onto said belt, a conveyer to which said belt feeds the signatures, means for moving said conveyer, a regulator for starting and stopping said conveyer and means operatively connected with said revolving shaft for intermittently operating said regulator.

10. In a book-assembling machine, two rotary bearing means, parallel signature-boxes pivoted at their ends in said bearing means, a device for withdrawing signatures and means for rotating said bearing means so as to bring said boxes successively opposite said withdrawing device.

11. In a book-assembling machine, a number of signature-boxes, a device for causing partial protrusion of signatures from said boxes, a device adapted to act on the portion of each signature so protruded for withdrawing the signatures from the boxes, means for conveying said boxes successively past said protruding means and for causing successive operation of the protruding and withdrawing devices.

JESSE D. HORTON.
ALBERT W. KAESSNER.

Witnesses:
HERBERT L. FORDHAM,
HAROLD S. MACKAYE.